US009740633B2

(12) United States Patent
Chiu et al.

(10) Patent No.: US 9,740,633 B2
(45) Date of Patent: Aug. 22, 2017

(54) UPDATABLE ADDRESS LOOKUP APPLICATION PROGRAM INTERFACE

(71) Applicant: International Business Machines Corporation, Armonk, NY (US)

(72) Inventors: Lawrence Y. Chiu, Saratoga, CA (US); Paul H. Muench, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 14/591,045

(22) Filed: Jan. 7, 2015

(65) Prior Publication Data

US 2016/0196217 A1    Jul. 7, 2016

(51) Int. Cl.
G06F 12/10      (2016.01)
G06F 9/54       (2006.01)
G06F 17/30      (2006.01)
G06F 12/1027    (2016.01)

(52) U.S. Cl.
CPC ............ *G06F 12/1027* (2013.01); *G06F 9/54* (2013.01); *G06F 17/30* (2013.01); *G06F 2212/651* (2013.01); *G06F 2212/657* (2013.01)

(58) Field of Classification Search
None
See application file for complete search history.

(56) References Cited

U.S. PATENT DOCUMENTS

| 2004/0167879 | A1  | 8/2004  | Cotner et al. |           |
|--------------|-----|---------|---------------|-----------|
| 2013/0046949 | A1* | 2/2013  | Colgrove      | G06F 3/0608 711/170 |
| 2013/0054869 | A1* | 2/2013  | Tolia         | G06F 12/0871 711/102 |
| 2013/0103658 | A1  | 4/2013  | Travis        |           |
| 2013/0254266 | A1* | 9/2013  | Kim           | G06F 9/44 709/203 |
| 2014/0040286 | A1  | 2/2014  | Bane et al.   |           |

OTHER PUBLICATIONS

Quittek et al., Definitions of Managed Objects for Remote Ping, Traceroute, and Lookup Operations (RFC4560), An IP.com Prior Art Database Technical Disclosure, Jun. 1, 2006, p. 1-102.
O'Donnell, An Architecture that Efficiently Updates Associative Aggregates in Applicative Programming Languages, An IP.com Prior Art Database Technical Disclosure, Sep. 30, 1985, p. 1-29.
Zhang et al., De-indirection for Flash-based SSDs with Nameless Writes, FAST 2012, p. 1-16.
Debnath et al., SkimpyStash: RAM Space Skimpy Key-Value Store on Flash-based Storage, Association for Computing Machinery, SIGMOD, Jun. 12-16, 2011, p. 1-12.
Chang et al., Bigtable: A Distributed Storage System for Structured Data, Seventh Symposium on Operating System Design and Implementation, Nov. 2006, p. 1-14.

* cited by examiner

*Primary Examiner* — Denise Tran

(74) *Attorney, Agent, or Firm* — Lieberman & Brandsdorfer, LLC

(57) ABSTRACT

Embodiments relate to a new application program interface (API) and supporting tools to introduce efficiency associated with a transaction. An in-memory translation table maintains accurate address locations of key-value pair locations. The new API employs the translation table to obtain both the requested data and any updated address associated with the requested data. Any subsequent API may be communicated with the updated address.

17 Claims, 9 Drawing Sheets

UPDATABLE ADDRESS LOOKUP APPLICATION PROGRAM INTERFACE

BACKGROUND

The present embodiment(s) relates to data storage and mapping a logical location of the stored data to a physical location. More specifically, the embodiment(s) relates to an address change of either a logical or physical address of the data, and an application program interface to convert any address changes together with any re-located data.

A key-value pair is a set of two linked data items, including a key, which is a unique identifier for an item of data, and the value, which is either the data that is identified or a pointer to the location of that data. The key-value pairs are mapped to a single container, which is an abstraction, similar to a file, providing a logical description of the way that data will be stored and the operations that will be permitted on that data. Each container consists of one or more container slots, and each container slot is mapped to a logical abstraction, such as a volume or a logical unit.

Delete operations of key-value pairs may take place in various forms, including deletion of a single key-value pair or multiple key-value pairs. Deletion of key-value pairs may be designated or arbitrary, both of which result in garbage which needs to be collected in order to reclaim the underlying resource(s). Collection of the garbage is applied to the actual data as well as the metadata, such as indexes and container address translation tables.

SUMMARY

The embodiment(s) includes a method, computer program product, and system for an updatable address translation table, and a new application program interface (API) tailored to interface with the address look-up table.

A method, computer program product, and system are provided for supporting the functionality of the new API while enabling an associated address look-up table to maintain accuracy and compaction. A key-value record is inserted into a storage container. The record includes returning a first record address associated with the inserted record. A first API request is serviced for the record. This includes attaching the first record address to the first request. Data associated with the record address within the container is retrieved, with the retrieval including returning a new address with the retrieved data for the record having been moved from the first address to the new address.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein form a part of the specification. Features shown in the drawings are meant as illustrative of only some embodiments, and not of all embodiments unless otherwise explicitly indicated.

DETAILED DESCRIPTION

It will be readily understood that the components of the present embodiment(s), as generally described and illustrated in the Figures herein, may be arranged and designed in a wide variety of different configurations. Thus, the following detailed description of the embodiments of the apparatus, system, and method of the present embodiment(s), as presented in the Figures, is not intended to limit the scope, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiment(s) as claimed herein.

A container slot lookup table is used to translate an address stored in an index to a container offset. More specifically, the table is employed to locate data. In the case of an organized and ordered lookup table, an exact entry in the table can be efficiently located. Complexity and inefficiency arise when entries are relocated, deleted, and/or subject to garbage collection. At the same time, the slot lookup table occupies space, and as the table increase in size, the amount of space it occupies increased. Accordingly, there is a desire to contain the size of the table.

Figure 1:
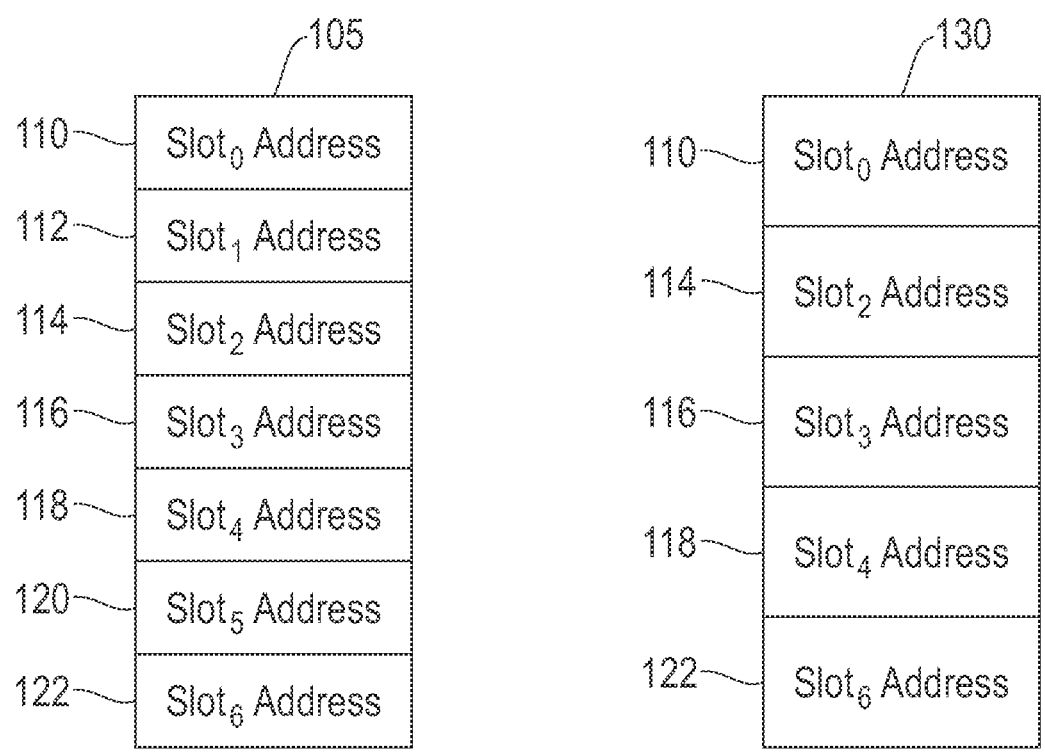
FIG. 1 depicts a block diagram illustrating an example container slot lookup table to translate address storage in an index with a container offset.

One tool to maintain the size of the table is to compact the table. If the slot lookup table is not compacted, space is wasted and the table continues to grow. At the same time, when the table is compacted, one or more entries may be relocated within the table, which would necessarily require additional searching to locate any relocated entries. Referring to FIG. 1, a block diagram (100) is provided illustrating an example container slot lookup table to translate address storage in an index with a container offset. Each entry in the table is referred to as a slot, and each slot includes one key or a collection of keys.

In the example provided herein, the table in its first incarnation (105) includes a plurality of entries (110), (112), (114), (116), (118), (120), and (122). The entries are sequentially placed in the table. More specifically, the table is maintained as a log and therefore is populated sequentially. As one or more entries are removed from the table, a slot is vacated. A garbage collection process is executed to remove any data or metadata remaining in the slot following removal of the entry. As shown in this example, once any entry is removed from the table, the sequential ordering of entries ceases to exist. More specifically, following the removal of a plurality of entries, the remaining entries are not sequentially ordered, as shown at (130). In the example shown at (130) with select entries removed, entries (114), (116), and (118) are sequential. However, the remaining table entries (110) and (122) are not sequential in their entirety following the removal of select entries (112) and (120). Furthermore, in the example provided, the garbage collection process has been executed and the table has been compacted. This is shown by the removal of empty slots in the table and the presentation of non-sequential entries. Accordingly, following removal of any slot in the lookup table, the table is compacted, as demonstrated by the adjacent positioning of non-sequential slot entries.

Figure 2:
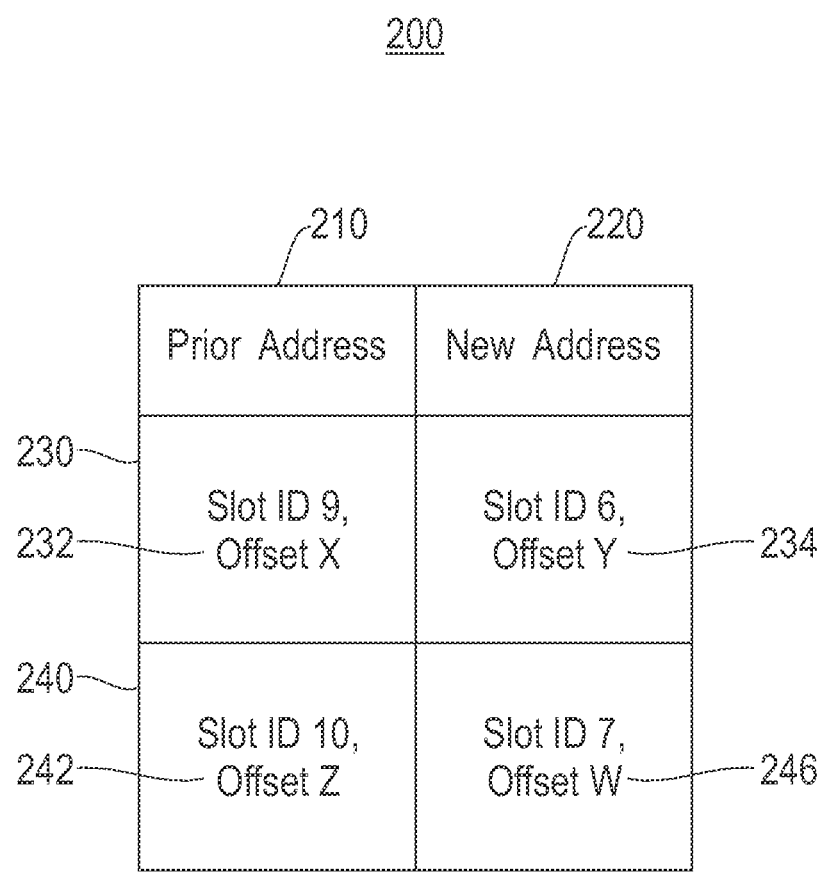
FIG. 2 depicts a block diagram illustrating an example of the translation table.

As introduced above, there is a cost associated with locating entries in the slot lookup table when the entries are not sequentially ordered. A translation table is introduced to mitigate or eliminate inefficiencies with the slot lookup table that arise from removal of any entries. More specifically, the translation table enables the slot lookup table to be compacted, while enabling efficient use of the slot lookup table. The translation table is maintained for accuracy of addresses for entries in the slot lookup table that remain following garbage collection and compaction. In one embodiment, the translation table is an in-memory table. Referring to FIG. 2, a block diagram (200) of the translation table is shown. In this example, there are two entries in the table, although the quantity shown is for descriptive purposes and should not be considered limiting. There are two columns provided in the table, including one column (210) referring to a prior address and a second column (220) referring to a new address. The first entry (230) identifies the original location in the slot lookup table as slot 9 and the offset of the address as X (232). However, after the garbage collection and compaction, the entry has been moved to slot 6 and the offset has been moved to address Y (234). The second entry (240) identifies the original location in the slot lookup table as slot 10 and the offset of the address is Z (242). After garbage collection and compaction, the second entry has been moved to slot 7 and the offset has been moved to address W (244). Accordingly, the translation table maintains a correspondence of entries in the lookup table before and after garbage collection and compaction.

An API (application program interface) is a language and message format used by an application program to communicate with the operating system or some other control program such as a database management system (DBMS) or communications protocol. APIs are implemented by writing function calls in the program, which provide the linkage to the required subroutine for execution. APIs may access the slot lookup table shown and described in FIG. 1. Accordingly, an API implies that a driver or program module is available in the computer to perform the operation or that software must be linked into the existing program to perform the tasks.

Some commonly used APIs include GET and PUT. The GET API corresponds to read a representation of a resource. More specifically, GET is idempotent in that multiple identical requests have the same results as a single request, since this API does not modify any resources. The PUT API corresponds to an update which includes returning a representation of the resource. When the PUT is employed to a known resource, the request body contains the newly updated representation of the original resource. As will be described in detail below, a new API interface is employed to retrieve data located at a specified address, and if the address has been changed the API returns the new address with the read data for the entry so that the received address may be used at a later point in time as a value provided with a GET API, or an equivalent API, to retrieve data.

Figure 3:
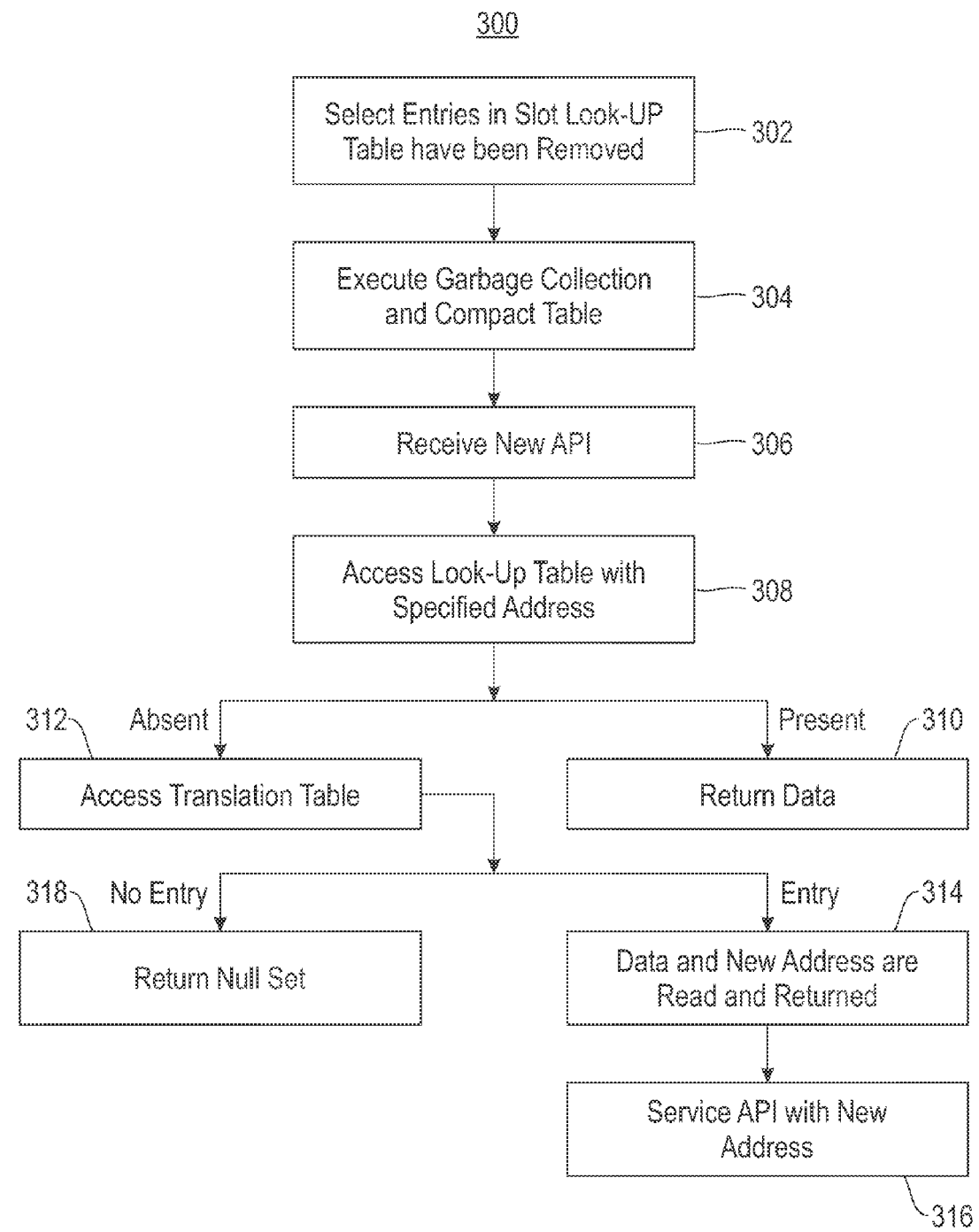
FIG. 3 depicts a flow chart illustrating use of the translation table in conjunction with a new API.

Referring to FIG. 3, a flow chart (300) is provided illustrating use of the translation table in conjunction with a new API. As shown in this example, entries in at least two slots of the corresponding slot lookup table have been removed (302). Garbage collection is executed to remove the entries in these slots and thereafter the table is compacted (304). After the table has been compacted, the new API is received at a storage server (306). As articulated above, the new API requests data at an address. The storage server is responsible for indexing the data and maintaining location of the data. The storage server accesses the slot lookup table with the address specified (308). If the address is present in the table at the specified address, the data is returned (310). However, if the address is not present in the table at the specified address, the storage server accesses a translation table for an entry corresponding to the requested address (312). If an entry is found in the translation table, both the data and the new address are read and returned (314) and the API is serviced with the new address (316). However, if there is no entry in the translation table, a null set is returned (318). The table compaction provides space efficiency, while the translation table provides accuracy. At the same time, the API provides efficiency in that it reduces multiple repeated requests for the same translation. As a result, subsequent GET requests with the new address can skip the translation step and achieve faster access to the data. Accordingly, the translation table shown herein is employed to provide updated slot table addresses while supporting the space efficiency associated with the slot address table.

The new API shown and described in FIG. 3 demonstrates use of the API to refresh an address. As shown, the API functions to provide the index server with an opportunity to update the address with the new address as referenced in the translation table.

Figure 4:
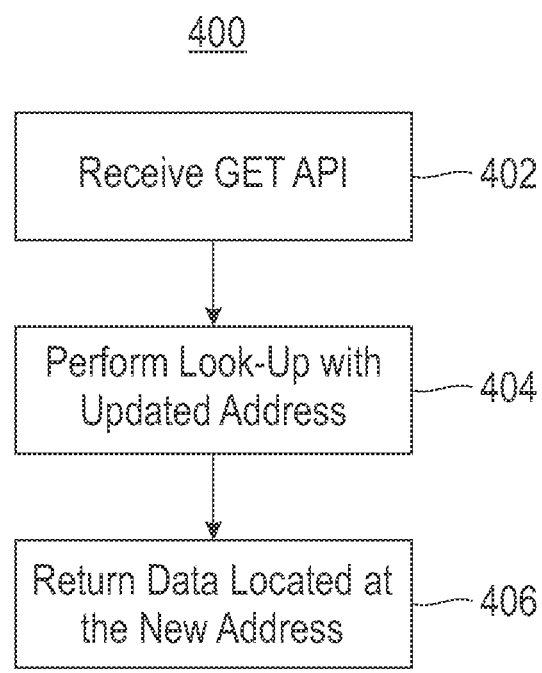
FIG. 4 depicts a flow chart illustrating use of a GET API for a subsequent request associated with an updated address.

Referring to FIG. 4, a flow chart (400) is provided illustrating use of a GET API for a subsequent request associated with an updated address. As shown, the GET API is received by the storage server (402). In one embodiment, the GET API is initiated by an index server in communication with a storage server, with the index server inserting a key-value recording into the container located at the storage server. Responsive to receipt of the GET API, the storage server performs a lookup in the pre-calculated location in the lookup table with the updated address (404), and returns the data located at the new address (406). In one embodiment, the GET API is issued by an index server in communication with a storage server. The index server retrieves the data located at the specified address within the container on the storage server as referenced by the updated address. Accordingly, after the index server has received an update, any subsequent requests with the new address have a shorter path.

Figure 5:
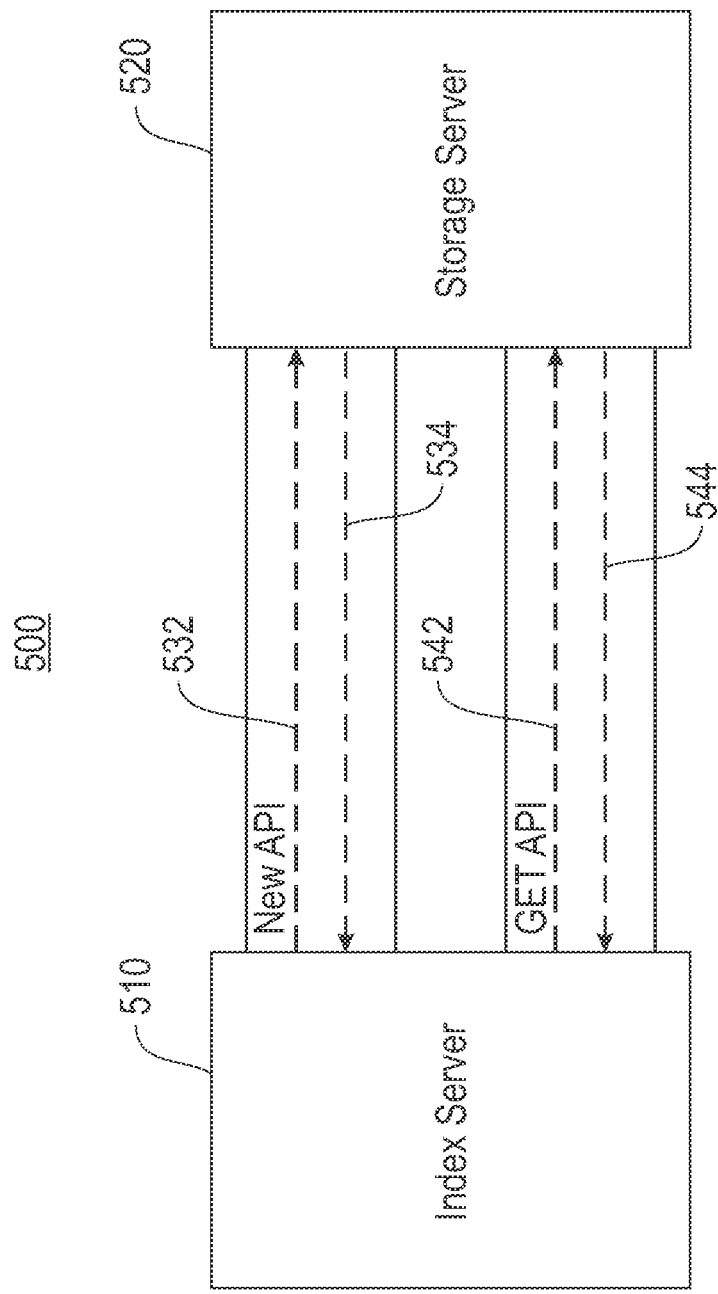
FIG. 5 depicts a block diagram illustrating key value operations between two servers.

Referring to FIG. 5, a block diagram (500) is provided illustrating key value operations between two servers. In the example shown herein, there is an index server (510) and a storage server (520). Although not shown herein, the storage server (520) is in communication with one or more storage devices, including virtual and persistent storage devices. Key value operations, as described above, are shown. The new API (530) is initiated by the index server and includes a key, a value, and a container. This operation is received (532) by the storage server (520), which returns both an updated address and the requested data (534) to the index server (510). The returned address may be saved in an associated index local to the index server (510) and employed in a subsequent GET API. The GET operation (540), also referred to as a GET API, is initiated by the index server and includes a container and an address. This operation is received (542) by the storage server (520), which returns (544) the data at the specified address to the index server (510). More specifically, through the GET API, the index server (510) retrieves data located at the specified address within the container on the storage server (520). In one embodiment, the address employed in the GET API is interpreted by the underlying layer using a container slot lookup table. The index server (510) and the storage server (520) may be co-located on the same physical or virtual systems, or in one embodiment located on different physical or virtual systems, or in another embodiment located in a cloud environment. Regardless of the location of the index and storage servers, the GET and new API function with the compact lookup table and the associated translation table to efficiently located data in a storage container.

The slot look-up table together with the translation table provide slot based storage management combined with an in-memory table to enable an efficient mechanism to read maintained records and garbage collect removed records. More specifically, efficient management of the in-memory translation table provides the above-described capabilities without expanding memory requirements for tracking deleted records.

Figure 6:
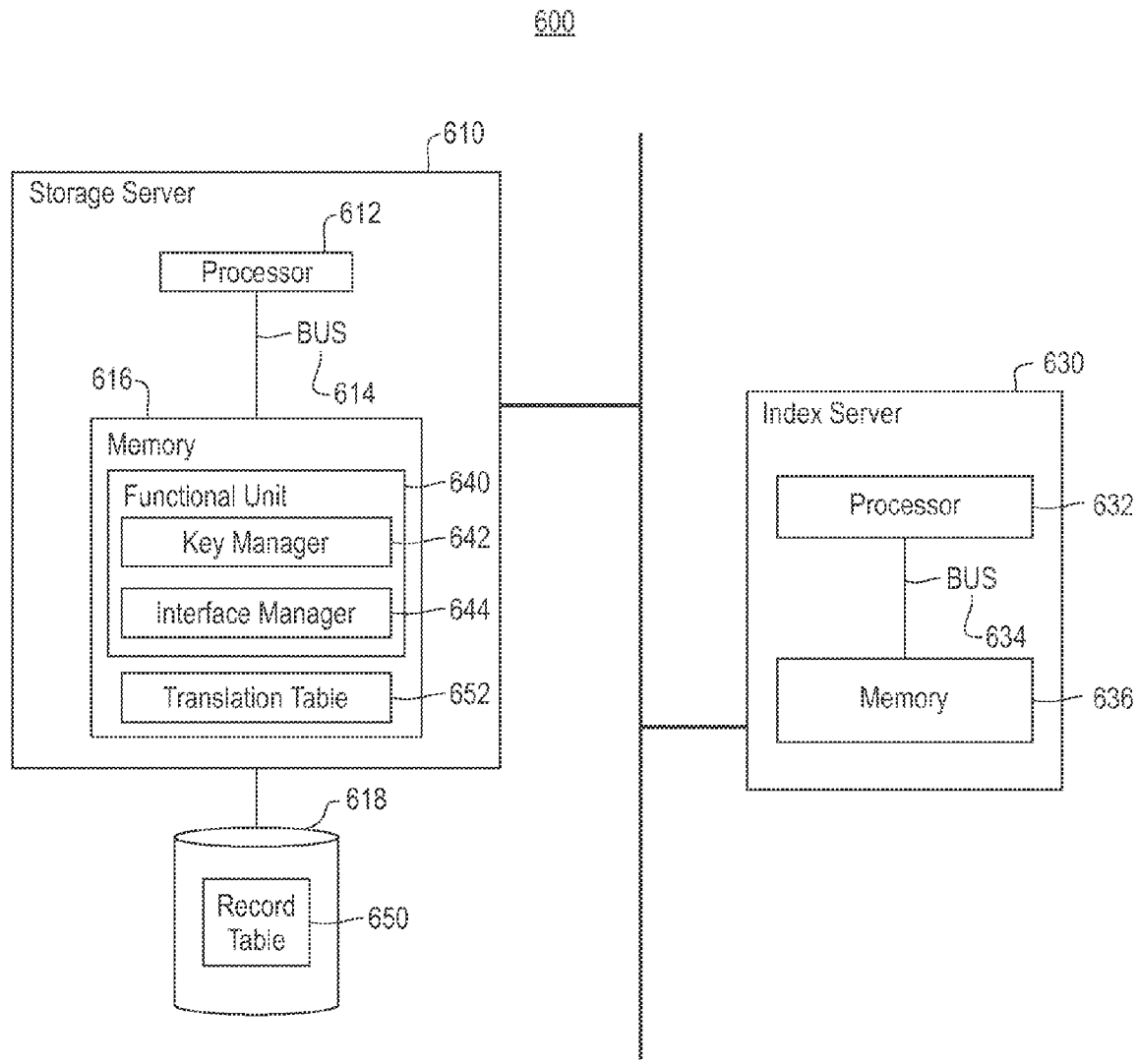
FIG. 6 depicts a block illustrating components embedded in a computer system to support the slot address look-up table and associated functionality.

Referring to FIG. 6, a block diagram is provided illustrating components embedded in a computer system to support the slot address look-up table and associated functionality. As shown, a storage server (610) is provided in communication with an index server (630). The storage server (610) is provided with a processor (612), also referred to herein as a processing unit, in communication with memory (616) across a bus (614). The storage server (610) is further provided in communication with persistent storage (618). In one embodiment, storage (618) represents a plurality of storage devices, or in a further embodiment, a shared pool of resources. The storage server (610) is responsible for the storage and maintenance of data in persistent storage (618). More specifically, the storage server (610) is provided with a functional unit (640) having one or more tools therein to support streamlining data requests to and from the storage (618). Similarly, in one embodiment, a virtual machine manager is provided local to or in communication with the storage server (610) to manage and maintain one or more virtual machines and associated virtual storage devices in communication with the persistent storage device (618).

The tools provided herein to support the data requests include a key manager (642) and an interface manager (644). Each of these managers functions to support and enable data requests. Furthermore, and as shown herein, at least two tables are provided to facilitated and support the data requests, including a record table (650) and a translation table (652). The record table (650) is shown herein local to the storage server (610) and functions to map a location of the key in a key-value pair to a physical address in persistent storage (618). The translation table (652) is shown herein as an in-memory table and it functions to update key addresses in response to a record change. As discussed above, address changes occur as records are removed from slots and the record table is compacted. Accordingly, the translation table (652) functions to maintain a current and accurate record of the key-value pair addresses.

The key manager (642) functions to write a key to a location, with the location having an associated address. The key manager (642) maintains the record table (650) so that the location address of the key-value is mapped to a physical address. An API function may be employed to return data at the associated address. More specifically, the interface manager (644) functions to service API requests. To access a specific key-value, the API request received by the interface manager (644) includes a location address of the specified key-value. The interface manager (644) accesses the record table (650) and if the address is present and accurate, the interface manager (644) returns data associated with the address provided. In addition, if the address is not present or accurate in the record table (650), the interface manager communicates with the translation table (652) to locate the new address, and to retrieve data in support of the API with an updated record referencing the new address. At such time as a second API is received with the updated address, the interface manager (644) services the request from the new address and returns the retrieved data. Accordingly, the interface manager functions to obtain and return a new address together with the requested data, while enabling the entity submitting the request to update the address for any subsequent requests.

As shown herein, the translation table (652) is provided as an in-memory map to maintain a translation of each record with a current associated address. In one embodiment, the translation table (652) is updatable, in that the table (652) reflects past, present, and/or current address changes. At such time as the record table (650) is updated through removal of key-value pairs and associated slots in the table are removed and compacted, the in-memory map is updated by the key manager (642) to identify any address changes. As described above, the new API will return any updated addresses with the requested data. A subsequent API request for the same data may reference the updated address, thereby eliminating reference to the translation table (652). Accordingly, the location of the data is maintained and current, and the new API efficiently services the request in response to the maintained data location.

The storage server (610) is shown in communication with an index server (630). As shown, the index server (630) is provided with a processor (632) in communication with memory (636) across a bus (634). The API requests discussed above are received from the index server, and the data and/or updated address(es) are communicated from the storage server (610) to the index server (630).

The storage server (610) described above in FIG. 6 has been labeled with tools in the form of a key manager (642) and an interface manager (644). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

As described and illustrated herein, the new application program interface is supported by the managers (642) and (644) and supporting tables (650) and (652) shown local to the storage server (610), as demonstrated in the system diagram and flow charts. In one embodiment, the functionality and support of the new application program interface may be extrapolated to a cloud computing environment with a shared pool of resources.

Figure 7:
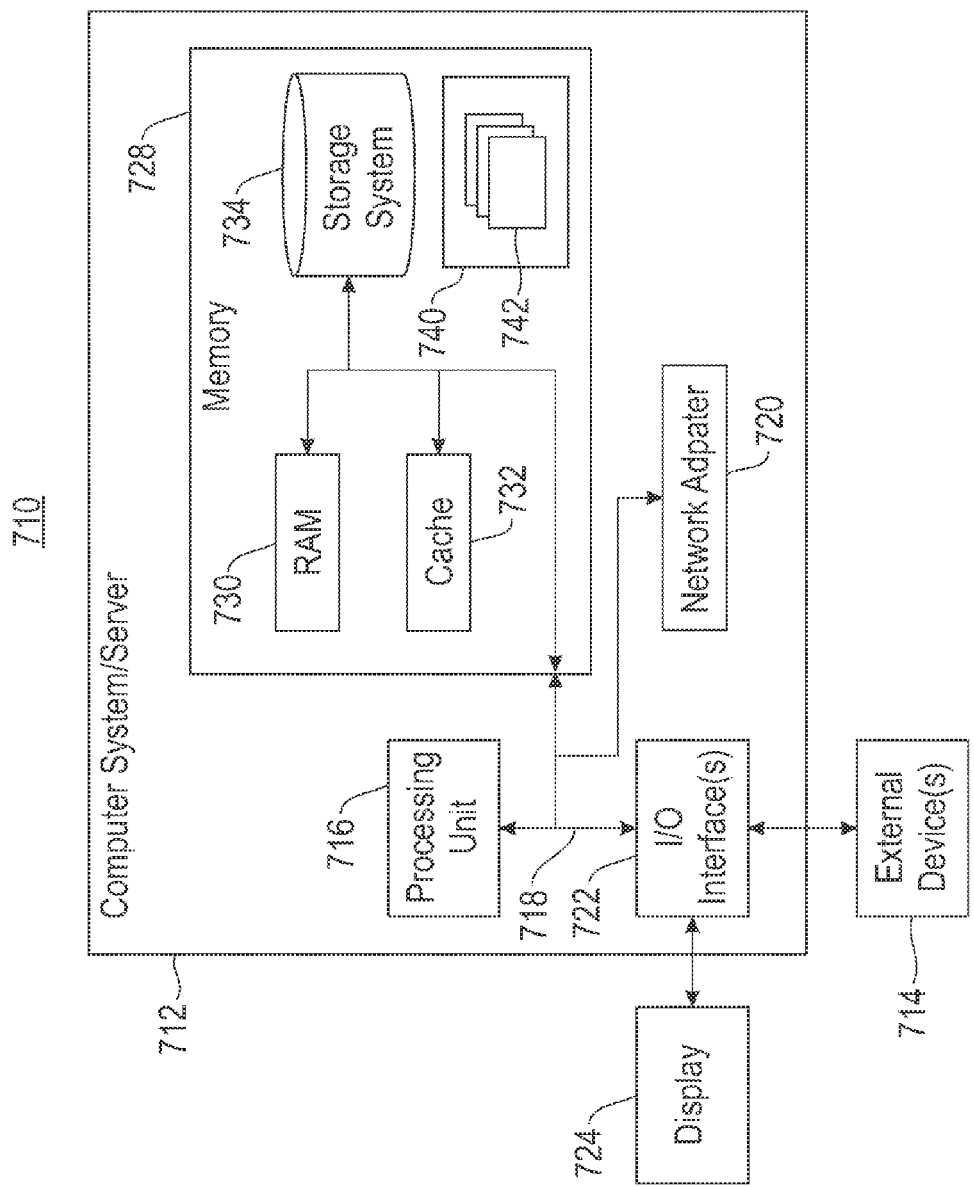
FIG. 7 depicts an example of a cloud computing node.

A cloud computing environment is service oriented with a focus on statelessness, low coupling, modularity, and semantic interoperability. At the heart of cloud computing is an infrastructure comprising a network of interconnected nodes. Referring now to FIG. 7, a schematic of an example of a cloud computing node is shown. Cloud computing node (710) is only one example of a suitable cloud computing node and is not intended to suggest any limitation as to the scope of use or functionality of embodiments described herein. Regardless, cloud computing node (710) is capable of being implemented and/or performing any of the functionality set forth hereinabove. In cloud computing node (710) there is a computer system/server (712), which is operational with numerous other general purpose or special purpose computing system environments or configurations. Examples of well-known computing systems, environments, and/or configurations that may be suitable for use with computer system/server (712) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (712) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (712) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server (712) in cloud computing node (710) is shown in the form of a general-purpose computing device. The components of computer system/server (712) may include, but are not limited to, one or more processors or processing units (716), system memory (728), and a bus (718) that couples various system components including system memory (728) to processor (716). Bus (718) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (712) typically includes a variety of computer system readable media. Such media may be any available media that is accessible by a computer system/server (712), and it includes both volatile and non-volatile media, and removable and non-removable media.

System memory (728) can include computer system readable media in the form of volatile memory, such as random access memory (RAM) (730) and/or cache memory (732). Computer system/server (712) may further include other removable/non-removable, volatile/non-volatile computer system storage media. By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (718) by one or more data media interfaces. As will be further depicted and described below, memory (728) may include at least one program product having a set (e.g., at least one) of program modules that are configured to carry out the functions of the embodiment(s).

Program/utility (740), having a set (at least one) of program modules (742), may be stored in memory (728) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments as described herein.

Computer system/server (712) may also communicate with one or more external devices (714), such as a keyboard, a pointing device, a display (724), etc.; one or more devices that enable a user to interact with computer system/server (712); and/or any devices (e.g., network card, modem, etc.) that enables computer system/server (712) to communicate with one or more other computing devices. Such communication can occur via Input/Output (I/O) interfaces (722). Still yet, computer system/server (712) can communicate with one or more networks such as a local area network (LAN), a general wide area network (WAN), and/or a public network (e.g., the Internet) via network adapter (720). As depicted, network adapter (720) communicates with the other components of computer system/server (712) via bus (718). It should be understood that although not shown, other hardware and/or software components could be used in conjunction with computer system/server (712). Examples, include, but are not limited to: microcode, device drivers, redundant processing units, external disk drive arrays, RAID systems, tape drives, and data archival storage systems, etc.

Figure 8:
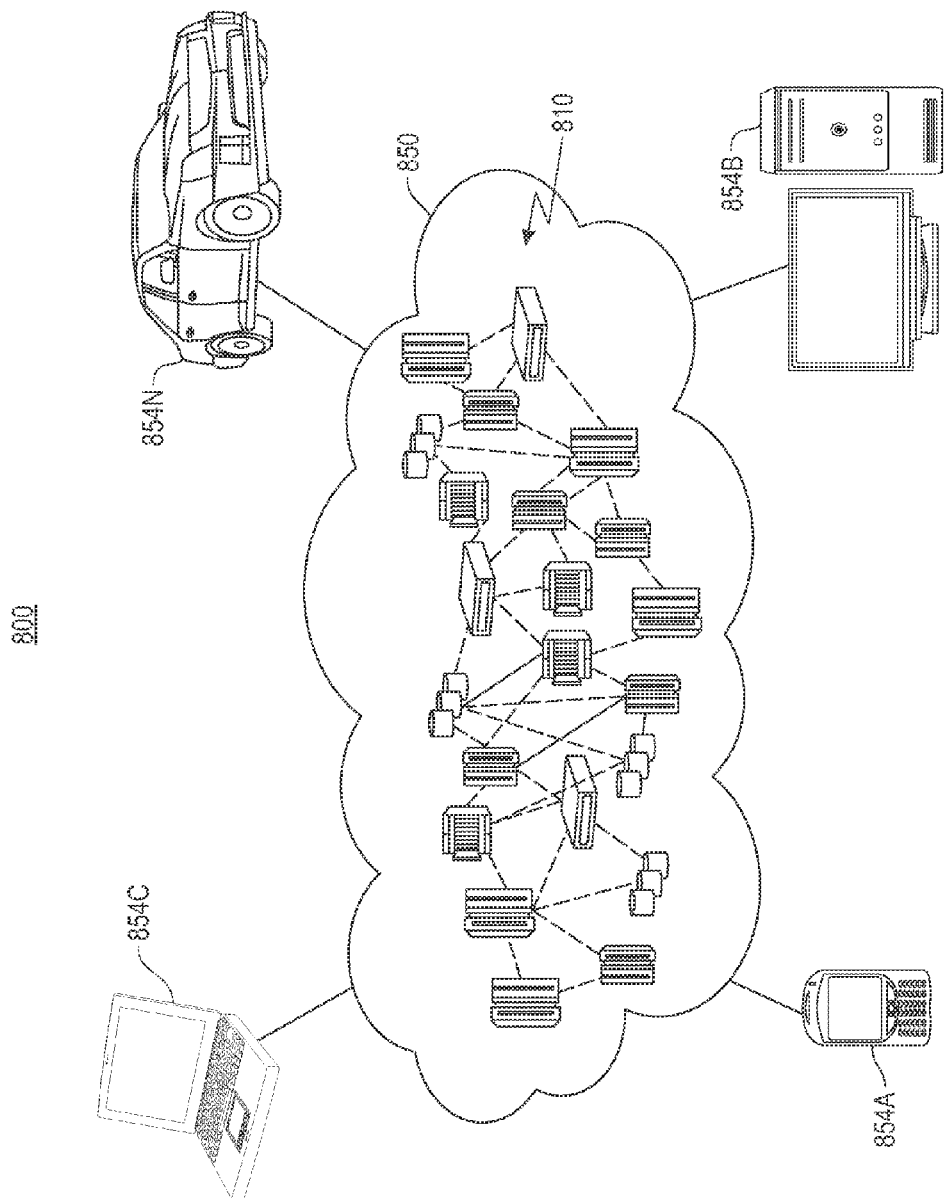
FIG. 8 depicts a cloud computing environment.

Referring now to FIG. 8, illustrative cloud computing environment (850) is depicted. As shown, cloud computing environment (850) comprises one or more cloud computing nodes (810) with which local computing devices used by cloud consumers, such as, for example, personal digital assistant (PDA) or cellular telephone (854A), desktop computer (854B), laptop computer (854C), and/or automobile computer system (854N) may communicate. Nodes (810) may communicate with one another. They may be grouped (not shown) physically or virtually, in one or more networks, such as Private, Community, Public, or Hybrid clouds as described hereinabove, or a combination thereof. This allows cloud computing environment (850) to offer infrastructure, platforms, and/or software as services for which a cloud consumer does not need to maintain resources on a local computing device. It is understood that the types of computing devices (854A)-(854N) shown in FIG. 8 are intended to be illustrative only and that computing nodes (810) and cloud computing environment (850) can communicate with any type of computerized device over any type of network and/or network addressable connection (e.g., using a web browser).

Figure 9:
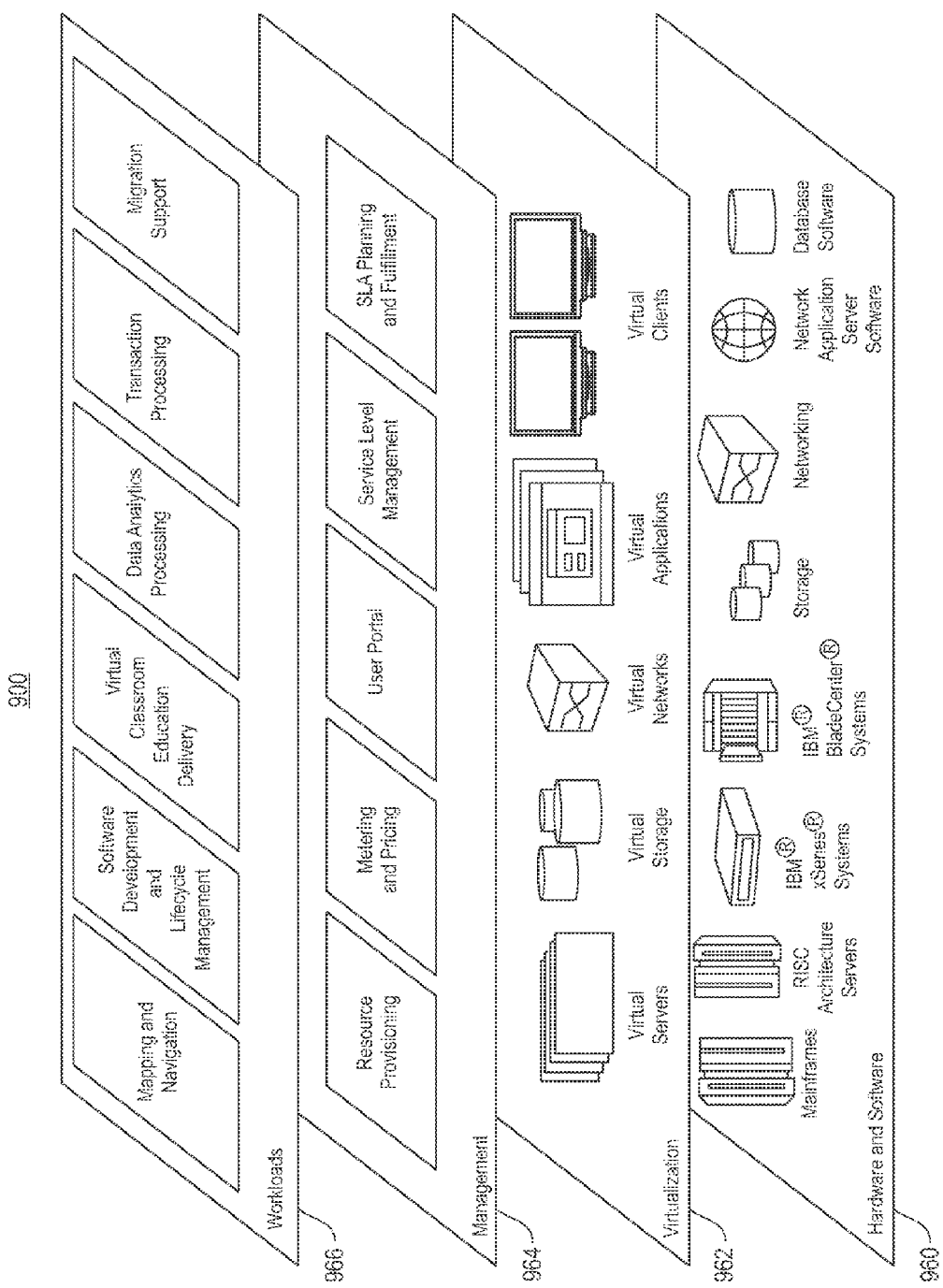
FIG. 9 depicts a set of functional abstraction layers provided by the cloud computing environment.

Referring now to FIG. 9, a set of functional abstraction layers provided by cloud computing environment (900) is shown. It should be understood in advance that the components, layers, and functions shown in FIG. 9 are intended to be illustrative only and embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, a management layer (930) may provide the following functions: resource provisioning, metering and pricing, user portal, service level management, and key management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Key management provides cloud computing and sharing of data among two or more entities such that required encryption and management of associated encrypted data are met.

Workloads layer (940) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

As will be appreciated by one skilled in the art, aspects of the present embodiment(s) may be embodied as a system, method, or computer program product. Accordingly, aspects of the present embodiment(s) may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present embodiment(s) may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present embodiment(s) may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiment(s) are described above with reference to flow chart illustrations and/or block diagrams of methods, apparatus (systems), and computer program products according to embodiments. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow charts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function(s)/act(s) specified in the flow chart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiment(s) may be a system, a method, and/or a computer program product. The computer program product may include a computer readable storage medium (or media) having computer readable program instructions thereon for causing a processor to carry out aspects.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flow chart illustrations and/or block diagrams of methods, apparatus (systems), and computer program products according to embodiments. It will be understood that each block of the flow chart illustrations and/or block diagrams, and combinations of blocks in the flow chart illustrations and/or block diagrams, can be implemented by computer program instructions.

The corresponding structures, materials, acts, and equivalents of all means or step plus function elements in the claims below are intended to include any structure, material, or act for performing the function in combination with other claimed elements as specifically claimed. The description of the present embodiment(s) has been presented for purposes of illustration and description, but is not intended to be exhaustive or limited to the form disclosed. Many modifications and variations will be apparent to those of ordinary skill in the art without departing from the scope and spirit. The embodiment was chosen and described in order to best explain the principles and the practical application, and to enable others of ordinary skill in the art to understand the various embodiments with various modifications as are suited to the particular use contemplated. Accordingly, the implementation of the translation table and supported functionality with the API provides a new and efficient interface for a storage server.

ALTERNATIVE EMBODIMENT

It will be appreciated that, although specific embodiments have been described herein for purposes of illustration, various modifications may be made without departing from the spirit and scope. In particular, the lookup could be made by partial-key, such as a regular expression, which could then be translated into one or more specific key lookups by the key manager. In another embodiment, a search is performed without use of an explicit translation table. More specifically, the search is performed with a binary or backward search in the address lookup table, or lookup based on a translation function. In another embodiment, the data may have been moved for a purpose other than garbage collection. For example, the data may have been moved to another physical device or logical container, for reasons including but not limited to age-out policy. The address translation process is invoked in this scenario. Accordingly, the scope of protection is limited only by the following claims and their equivalents.

What is claimed is:

1. A method comprising:
servicing a first application program interface request for a key-value record in a storage container, wherein the first request includes a first record address and a key value;
determining an address translation in response to determining the key value is absent at the first record address in the storage container, including accessing a translation table, wherein the translation table maintains a mapping of at least one address change of at least one key-value record, including an entry having the first record address mapped to a second record address; and
retrieving data associated with the first record address within the container utilizing the determined translation including the second record address, the retrieval including the second address returned with the retrieved data for the record moved from the first record address to the second record address.

2. The method of claim 1, further comprising:
updating an index with the returned second record address; and
servicing a second application program interface request for the record utilizing the updated index, wherein the second request includes the returned second address, and retrieving data within the record at the second address.

3. The method of claim 2, further comprising updating the translation table within the second address in response to a record address change.

4. The method of claim 3, further comprising eliminating translation of the first record address to the second record address by utilizing the updated index.

5. The method of claim 1, further comprising servicing the first request with a prior record address for an unchanged record address, and retrieving data associated with the prior record address, the retrieval consisting of the retrieved data.

6. The method of claim 1, wherein the record was moved from the first record address to the second record address in response to a container cleaning operation selected from the group consisting of: record deletion, record relocation, garbage collection, and container compaction.

7. The method of claim 1, wherein the key-value record is stored in an index within the storage container and further comprising accessing the key-value record, the key-value record to translate the second record address into an offset of the container to support retrieving the data.

8. A computer system comprising:
a processor in communication with data storage;
a functional unit in communication with the processor, the functional unit having a tool to support streamlining data requests, the tool comprising:
an interface manager to service an application program interface request for a key-value record in the data storage, wherein the request includes a first location address of the key-value record and a key value;
the interface manager to determine an address translation in response to a determination of the key value being absent at the first location address, including accessing a translation table, wherein the translation table maintains a mapping of at least one address change of at least one key-value record, including an entry having the first location address mapped to a second location address; and
the interface manager to return data associated with the first location address within the data storage utilizing the determined translation including the second location address, the retrieval including the interface manager to return the second location address with the retrieved data for the key-value record moved from the first location address to the second location address.

9. The system of claim 8, further comprising the interface manager to;
update an index with the returned second location address: and
service a second application program interface request for the key-value record utilizing the updated index, wherein the second request includes the returned second location address, and the interface manager to return retrieved data from the second location address.

10. The system of claim 9, further comprising the key manager to update the translation table within the second location address in response to a record address change.

11. The system of claim 10, further comprising the interface manager to eliminate translation of the first location address to the second location address by utilizing the updated index.

12. The system of claim 8, further comprising the interface manager to service the first request with the first record location address for an unchanged record address, and to retrieve data associated with the first location address, the retrieval consisting of the retrieved data.

13. A computer program product for an updatable lookup application program interface, the computer program product comprising a computer readable storage device having program code embodied therewith, the program code executable by a processing unit to:
service a first application program interface request for the a key-value record in a storage container, wherein the first request includes the first record address and a key value;
determine an address translation in response to a determination of the key value being absent at the first record address, including accessing a translation table, wherein the translation table maintains a mapping of at least one address change of at least one key-value record, including an entry having the first record address mapped to a second record address;
and
retrieve data associated with the record address within the container utilizing the determined translation including the second record address, the retrieval including the second address returned with the retrieved data for the key-value record moved from the first address to the second address.

14. The computer program product of claim 13, further comprising program code to:
update an index with the returned second address; and
service a second application program interface request for the record utilizing the updated index, wherein the second request includes the changed address, and retrieve data within the record at the changed address.

15. The computer program product of claim 14, further comprising program code to update the table within the changed address in response to a record address change.

16. The computer program product of claim 15, further comprising eliminating translation of the first record address to the second record address by utilizing the update index.

17. The computer program product of claim 13, further comprising program code to service the first request with the first record address for an unchanged record address, and retrieve data associated with the first record address, the retrieval consisting of the retrieved data.

\* \* \* \* \*